(12) United States Patent
Wheatley, III et al.

(10) Patent No.: US 6,381,230 B1
(45) Date of Patent: Apr. 30, 2002

(54) METHOD AND SYSTEM FOR PROVIDING PERSONAL BASE STATION COMMUNICATIONS

(75) Inventors: Charles E. Wheatley, III, Del Mar; Edward G. Tiedemann, Jr., San Diego; Joseph P. Odenwalder, Del Mar; Rajeev Krishnamurthi, San Diego, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/123,495

(22) Filed: Jul. 28, 1998

(51) Int. Cl.⁷ .......................... H04Q 7/00; H04B 7/216; H04B 7/15
(52) U.S. Cl. ................ 370/328; 370/342; 370/331; 455/442
(58) Field of Search ................. 370/329, 330, 370/335, 342, 343, 328, 331, 332, 333; 375/229, 347, 267, 399; 455/11.1, 442–444, 443, 446, 449, 524

(56) References Cited

U.S. PATENT DOCUMENTS

| | | | |
|---|---|---|---|
| 5,218,717 A | 6/1993 | Reitberger | 455/51.2 |
| 5,425,030 A | 6/1995 | Comroe et al. | 370/95.1 |
| 5,550,895 A | 8/1996 | Burson et al. | 379/59 |
| 5,640,678 A * | 6/1997 | Ishikawa et al. | 455/449 |
| 5,751,763 A * | 5/1998 | Bruckert | 370/342 |
| 5,940,743 A * | 8/1999 | Sunay et al. | 370/331 |
| 6,011,971 A * | 1/2000 | Jolma | 455/443 |

FOREIGN PATENT DOCUMENTS

| | | |
|---|---|---|
| DE | 4319694 | 12/1994 |
| WO | 9523488 | 8/1995 |
| WO | 9708854 | 3/1997 |

* cited by examiner

Primary Examiner—Chau Nguyen
Assistant Examiner—Phuongchau Ba Nguyen
(74) Attorney, Agent, or Firm—Philip R. Wadsworth; Kent D. Baker; Tom Streeter

(57) ABSTRACT

A method and system for operation of a personal base station where the forward link of a personal base station is on the same frequency assignment as a first forward link data signal transmitted by a macro base station belonging to a cellular communication system. A first subscriber station communicates with the macro base station. The personal base station generates a second forward link data signal and communicates with a second subscriber station. The personal base station receives the first forward link data signal and combines it with its own second forward link data signal to form a combined forward link data signal. The personal base station then transmits the combined forward link data signal. The first subscriber station is able to receive and diversity combine the combined forward link data signal, improving the signal to noise ratio that would otherwise occur in the vicinity of the personal base station.

32 Claims, 6 Drawing Sheets

METHOD AND SYSTEM FOR PROVIDING PERSONAL BASE STATION COMMUNICATIONS

BACKGROUND OF THE INVENTION

I. Field of the Invention

The present invention relates to wireless communication systems. More particularly, the present invention relates to a novel and improved method and system for providing personal base station communications within the coverage area of a cellular base station.

II. Description of the Related Art

As wireless communication systems become more prevalent in society, the demands for greater and more sophisticated service have grown. To meet the capacity needs of wireless communication systems, techniques of multiple access to a limited communication resource have been developed. The use of code-division multiple access (CDMA) modulation techniques is one of several techniques for facilitating communications in which a large number of system users are present. Other multiple access techniques, such as time-division multiple access (TDMA) and frequency-division multiple access (FDMA) are known in the art. However, spread-spectrum modulation techniques of CDMA have significant advantages over these other modulation techniques for multiple access communication systems.

The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM," assigned to the assignee of the present invention and incorporated herein by reference. The use of CDMA techniques in a multiple access communication system is also further disclosed in U.S. Pat. No. 5,101,501, issued Mar. 31, 1992, entitled "METHOD AND SYSTEM FOR PROVIDING A SOFT HANDOFF IN COMMUNICATIONS IN A CDMA CELLULAR SYSTEM," assigned to the assignee of the present invention and incorporated herein by reference.

The teachings of the just mentioned patents have been applied to relatively large wireless communication systems such as cellular telephone systems that, in turn, interface with a public switched telephone network (PSTN). In this way, the user of a subscriber station such as a cellular telephone may generally originate or receive calls from any other communication device connected to the PSTN as long as the subscriber station is located within the geographical coverage area of any wireless base station belonging to the cellular system. The coverage area for these base stations generally extends several miles. The base stations of these cellular systems are generally referred to as "macro" base stations, and their respective cell sites as "macro" cell-sites.

Due to the relatively high cost of cellular telephone service through these macro base stations as compared to traditional landline telephone service, it is not presently cost effective to use a cellular telephone for all of one's desired telephone communications. Thus, users of cellular telephones generally use the cellular telephone only when a convenient landline connection is not available, such as when they are away from their home or office. This leads to inconvenience as the user must switch between phones when entering or leaving his home or office.

Some prior art wireless telephones have been suggested which operate in a dual-mode cellular/cordless manner in a common handset. These prior art wireless telephones provide cellular service to the PSTN through the macro cells of a cellular communication system, and cordless service to the PSTN through a "micro" base station such as a standard cordless telephone base unit. The dual-mode cellular/cordless handset automatically switches between the standard cellular mode of operation and the cordless mode of operation as the user transitions into the coverage area of the micro base station. Thus, when the user is away from home, he uses the dual-mode phone in the cellular mode, and incurs cellular service charges. However, when the user is within the coverage area of the cordless telephone base unit, typically inside of the home or office, he uses the dual-mode phone in the cordless mode, avoiding the cellular service charges.

A problem with the prior art solution is that since the dual-mode telephones typically must operate on two different frequency bands and use two different communication protocols and modulation schemes, they must include additional costly components. For example, they typically include separate transmit and receive paths for the cellular and the cordless signals, complex switches and special control circuits. These additional components add cost, size and weight to the prior art dual-mode telephones.

What is needed is a communication system that simultaneously provides cellular service and local wireless service without increasing the cost or complexity of the subscriber station.

SUMMARY OF THE INVENTION

The present invention is a novel and improved method and system for providing personal base station communications within the "cell" of a cellular base station. As defined and used herein the term "cell" will refer to a geographical coverage area whereas the term "cell-site" will be used to refer to the physical equipment used to perform communications, i.e. one or more base stations. The present invention provides a method and system for operation of a personal base station where the forward link (base station to subscriber station) of a personal base station is on the same frequency assignment as the forward link of a macro base station belonging to a cellular communication system. By operating the personal base station on the same frequency assignment as the macro base station, an operator is not required to use additional spectrum in order to support the micro base station. Since an operator has a fixed amount of spectrum allocated to it, and if the operator was using au of its existing spectra, the operator would have to undergo great expense to add more cells to free up a frequency. Other alternatives such as obtaining more spectrum are generally not available to an operator. Although the present invention is disclosed herein with reference to a CDMA system, it is understood that the teachings are equally applicable to other wireless communication schemes, whether digital or analog, and regardless of the modulation scheme employed.

In the present invention, a first wireless base station is operated on the same frequency band as a second wireless base station. The first wireless base station, a "macro" base station, generates and transmits a first forward link data signal and communicates with a first subscriber station. A second wireless base station, a "micro" base station, generates a second forward link data signal and communicates with a second subscriber station. The second wireless base station receives the first forward link data signal and combines it with its own second forward link data signal to form a combined forward link data signal. The second wireless base station then transmits the combined forward link data signal. Thus, the first subscriber station, which is in communication with the macro base station, is able to receive and diversity combine the macro base station forward link data from the combined forward link data signal transmitted by the micro base station, improving the signal to noise ratio that would otherwise occur in the vicinity of the micro base station.

In a first embodiment of the present invention, the micro base station combines the first forward link signal with its own outgoing second forward link signal at radio frequency (RF). In a second embodiment of the present invention, the micro base station combines the first forward link signal with its own outgoing second forward link signal at an intermediate frequency (IF).

The present invention also delays the received first forward link data signal for a predetermined delay period prior to combining it with the second forward link data signal, so that it appears to the first subscriber station as a resolvable multipath signal. In order to avoid self-interference, the second wireless base station switches between receiving the first forward link data signal and transmitting the combined forward link data signal at a predetermined switching period. In the preferred embodiment, the predetermined switching period results in approximately a 50% transmit duty cycle. Thus, the micro base station does not transmit substantially continuously, but rather switches roughly on the "half-interval" of a predetermined time interval between transmitting a combined signal, and receiving the first forward link signal from the macro base station.

In another aspect of the present invention, a power measurer in the micro base station measures a power level of the delayed received first forward link data signal and a gain adjuster adjusts the power level of the delayed received first forward link data signal in response to the power level measurement in order to scale the first forward link data signal with respect to the second forward link data signal. In the preferred embodiment, the scaling factor is determined in accordance with the received power of the first forward link signal as measured by the power measurer. This scaling is performed in order to ensure sufficient energy of the retransmitted macro base station forward link data at the first subscriber station without unduly degrading the signal to noise ratio of the micro base station's own forward link data at the second subscriber station.

In accordance with another aspect of the present invention, unacceptable interference from the second subscriber station, which is communicating with the micro base station, is avoided by the micro base station either terminating communication with second subscriber station or executing a handoff of the second subscriber station to the macro base station when the transmit power of the second subscriber station exceeds a predetermined threshold. In this regard, a power control command generator in the micro base station generates power control commands, each of the power control commands indicating an increase or decrease in transmit power. A transmitter in the micro base station transmits these power control commands to the second subscriber station. To avoid excessive interference, the micro base station terminates communication with the second subscriber station if the micro base station transmits a predetermined number of consecutive power control commands indicating an increase in transmit power. In an alternative embodiment, the base station informs the second subscriber station of the maximum power that the second subscriber station using the micro base station is allowed to transmit. The second subscriber station is not allowed to exceed this power while communicating with the micro base station. When the second subscriber station using the micro base station reaches this limit, the micro base station will continually send power control commands to have the second subscriber station increase its output power; however, the second subscriber station does not increase its transmit power. The micro base station can then sense that the second subscriber station is at the edge of coverage and release the call. The micro base station can set the maximum amount of power that the second subscriber station is allowed to transmit by monitoring the amount of power which is received from the macro base station.

In accordance with another aspect of the present invention the macro base station typically includes means for maintaining extremely accurate time and frequency reference. This is generally accomplished by means of a Global Positioning System (GPS) satellite receiver or other expensive equipment. However, it may be prohibitively expensive to provide such precision equipment at the micro base station. Thus, in the present invention, the micro base station obtains the accurate time and frequency reference from the macro base station. In this regard, the micro base station includes a demodulator which demodulates the received first forward link data signal, and time reference determining means for determining a time reference from the demodulated received first forward link data signal. Furthermore, the micro base station includes frequency reference determining means for determining a frequency reference from the demodulated received first forward link data signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In a CDMA cellular system, such as that described by Telecommunications Industry Association (TIA)/ Electronics Industries Association (EIA) Interim Standard IS-95, entitled "Mobile Station—Base Station Compatibility Standard for Dual-Mode Wideband Spread Spectrum Cellular System," the forward link (base station to mobile station) operates in a 1.25 MHz frequency channel. For example, according to IS-95, the forward link of a base station may operate on a particular 1.25 MHz CDMA channel assigned from among a plurality 1.25 MHz-wide CDMA channels located in the 869.70 MHz to 893.31 MHz range.

A single CDMA base station may transmit different information signals to each of its multiple subscriber stations over the same 1.25 MHz frequency channel. The CDMA base station may modulate each respective information signal with a different pseudo-noise (PN) code which spreads the information signal in frequency. A particular subscriber station is then able to discriminate the information signal of interest to it by correlating the received signal with the same PN code that was used by the base station to modulate that signal, thereby despreading only the desired information signal. The remainder of the information signals, whose codes do not match, are not despread in bandwidth. As a result, these other information signals contribute to noise at the subscriber station receiver and represent a self-interference generated by the CDMA system. For similar reasons, signals from neighboring base stations also contribute to the noise at the subscriber station receiver.

As long as the ratio of the energy per bit ($E_b$) of the desired information signal to the noise power spectral density ($N_0$) of the operating environment is sufficiently large, the desired information signal may be successfully demodulated. However, when the $E_b/N_0$ of the desired information signal is low, such as in the presence of significant interference from other base stations, error rates become unacceptably high. For these reasons, as a subscriber station moves from the coverage area of a first base station into the coverage area of a second base station, it will generally execute a "handoff" from the first base station to the second base station when signals from the second base station exceed a predetermined threshold. These general principles are described in more detail in the above-mentioned patents. The same general principles of acceptable signal to noise ratio apply to other wireless communication systems as well.

Figure 1:
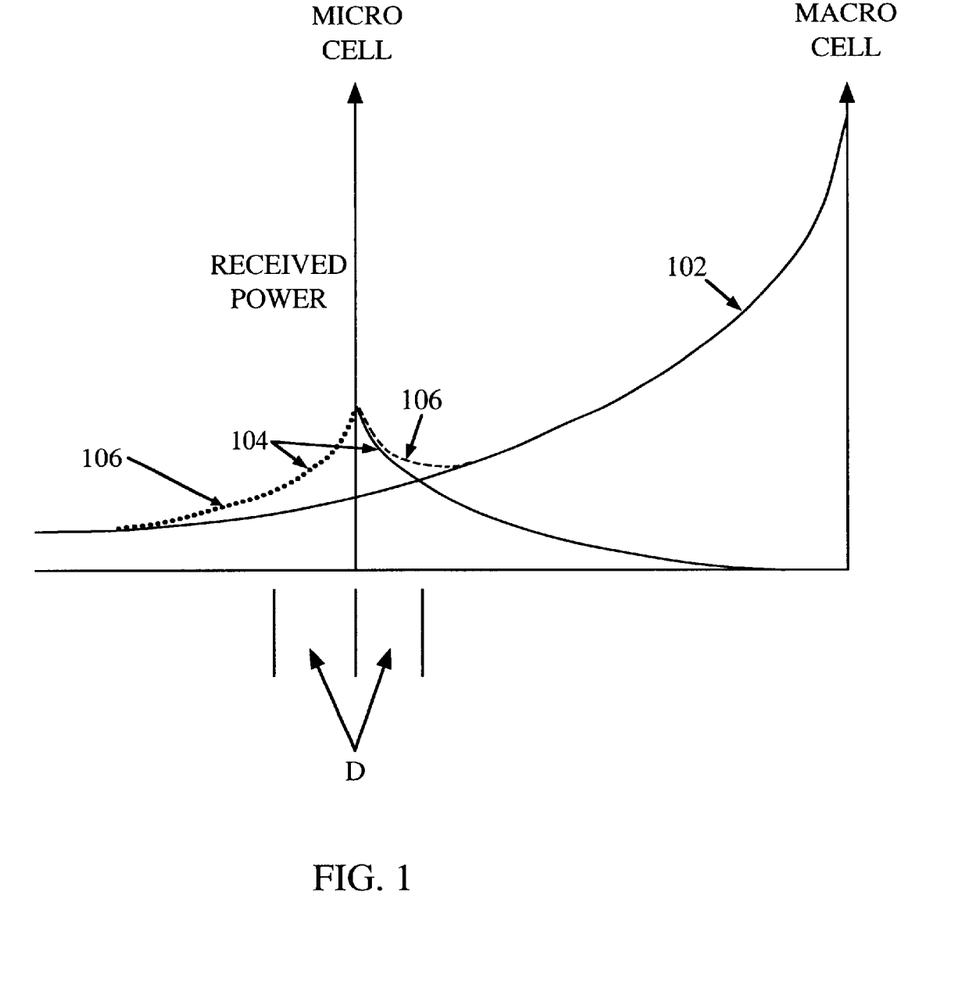
FIG. 1 is a graph of received power as a function of distance from a macro base station and a micro base station of the present invention.

This presents a significant problem if a personal base station is operated on the same assigned 1.25 MHz frequency channel as a neighboring macro base station. The problem is illustrated by FIG. 1. Line 102 represents the power received at a subscriber station from a macro base station as a function of the distance from the macro base station. Line 104 represents the power received at the subscriber station from the personal base station, which will also be referred to herein as a "micro" base station, as a function of distance from the micro base station. Thus, as a subscriber station which is communicating with the macro base station moves away from the macro base station, and toward the micro base station, the relative power received from the micro base station increases. In order to be inexpensive, a personal base station is relatively small and does not have the resources to accept a handoff from a neighboring macro base station, even if it were desirable to do so. Furthermore, if the micro base station had the resources to accept handoffs, it may not be desirable to operate the micro base station in a manner in which it accepts all handoffs or calls from the macro base station. Thus, at some distance, designated "D", the power received from the micro base station, which represents interference to the subscriber station communicating with the macro base station, becomes large enough to cause unacceptably high demodulation error rates.

An example of the dilemma illustrated in FIG. 1 is when a mobile telephone user, communicating with a macro base station via a mobile telephone in his car, drives by a house that has a personal base station operating its forward link on the same frequency assignment as the forward link of the macro base station. Since the personal base station belongs to the homeowner, it is generally programmed to accept call originations or handoffs from "home" subscriber stations only (i.e. those that are associated with the micro base station), and not from "foreign" subscriber stations (i.e., those that are not associated with the micro base station). This may be accomplished, for example, by the micro base station recognizing the identity of the mobile station, such as the IMSI or ESN, which is allowed to make an origination or perform a handoff. This can be verified in order to prevent fraud by the use of an authentication key or Personal Identification Number (PIN) shared by the "home" subscriber station and the micro base station. The micro base station may also be informed by the network of authorized mobile stations and the micro base station may recognize these mobiles via their IMSI or ESN. Thus, as the mobile telephone user approaches the house, the interference from the personal base station would become unacceptably high in the absence of the present invention.

I. Micro Base Station Repeater

The present invention provides a method and apparatus for operation of a personal base station where the forward link of the personal base station is on the same frequency channel as the forward link of a macro base station belonging to a neighboring wireless communication system. The solution is for the personal base station to "listen" for a portion of the time to what the macro base station is transmitting on its forward link to the subscriber station. The micro base station then combines the macro base station forward link data with its own outgoing forward link data. The two signals may be scaled relative to each other and combined so that a passing subscriber station could demodulate its desired information signal, which originated at the macro base station, from the combined signal transmitted by the micro base station. An overview of the system 200 of the present invention is illustrated in FIG. 2.

Figure 2:
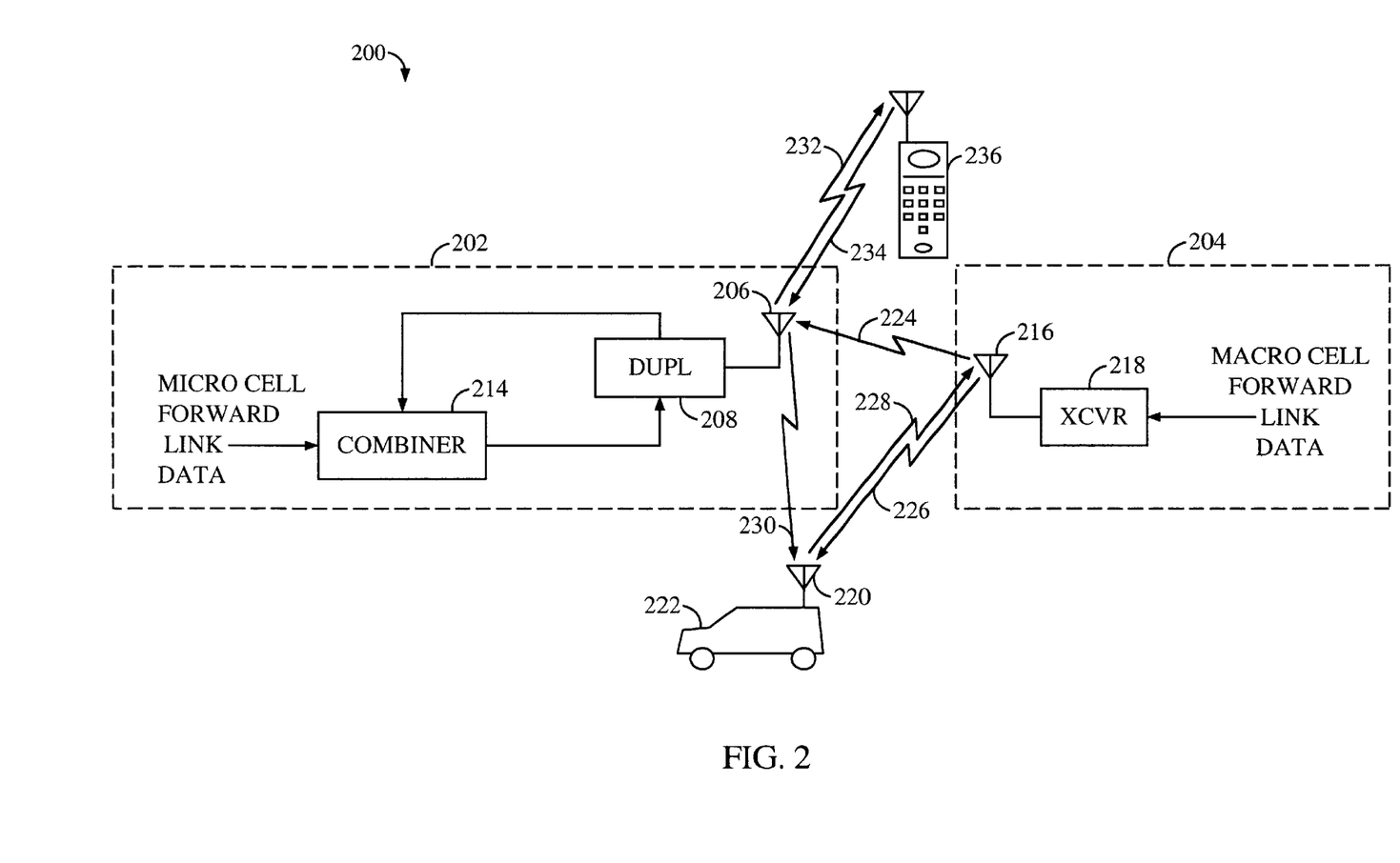
FIG. 2 is an overview block diagram of the system of the present invention.

In FIG. 2, a mobile station 222 is shown in communication with macro base station 204. Thus, the desired information signal for mobile station 222, as part of the macro base station forward link data, is transmitted by transceiver (XCVR) 218 over macro base station antenna 216 and forward link path 226. Mobile station 222 receives the macro base station forward link data via antenna 220. Mobile station 222 also transmits a reverse link signal via antenna 220 and over reverse link path 228 which is captured by macro base station antenna 216 and received by XCVR 218. Thus, mobile station 222 would generally correspond to the "foreign" subscriber station which is not associated with the micro base station 202.

Also shown in FIG. 2 is a portable station 236 in communication with micro base station 202. The forward link signal transmitted by micro base station 202 is received by the portable station 236 over forward link path 232. Portable station 236 also transmits a reverse link signal over reverse link path 234 which is received by micro base station 202. Thus, portable station 236 would generally correspond to the "home" subscriber station which is associated with the micro base station. Portable station 236 may also be able to receive some signal from macro base station 204 on the forward link. However, this invention assumes that the mobile station is not in soft handoff with the macro base station. Thus, the macro base station 204 may be providing some interference to portable station 236 and portable station 236 may not be obtaining signals with desired user information from macro base station 204. Similarly, macro base station 204 may be receiving some signal from portable station 236; however, it is not processing the reverse link from portable station 236 and, thus, the received signal is interference.

It should be noted that both mobile station 222 and portable station 236 could be any type of wireless subscriber station, whether mobile, portable, or otherwise. However, for purposes of illustration clarity and simplicity, they will be referred to herein as a mobile station 222 and a portable station 236.

Micro base station 202 also receives the forward link data signal transmitted by macro base station 204 over forward link path 224. The signal is captured by micro base station antenna 206 and routed by duplexer 208 to combiner 214. Combiner 214 combines the forward link data signal transmitted by macro base station 204 with the micro base station's own forward link data. The resultant combined forward link data signal is then transmitted through duplexer 208 and antenna 206. The mobile station 222 receives the combined forward link data signal over forward link path 230. Thus, mobile station 222 is able to receive and diversity combine the macro base station forward link data over both forward link path 226 and forward link path 230, improving the signal to noise ratio that would otherwise occur in the vicinity of the micro base station 202. The same combined forward link data signal is also received by portable station 236 over forward link path 232.

The duplexer 208 may also serve another function of separating the portable station 236 transmit frequency from the micro base station 202 transmit frequency. The signal which has been received from the portable station 236 is then fed to a receiver and demodulator which are not shown in FIG. 2. The receiver and demodulator are similar in form to those used in the macro base station 204. However, the micro base station 202 is typically designed to handle only a single call or a few calls, thus the receiver and demodulator of micro base station 202 can be much simpler in design than the receiver and demodulator in the macro base station 204.

Figure 3:
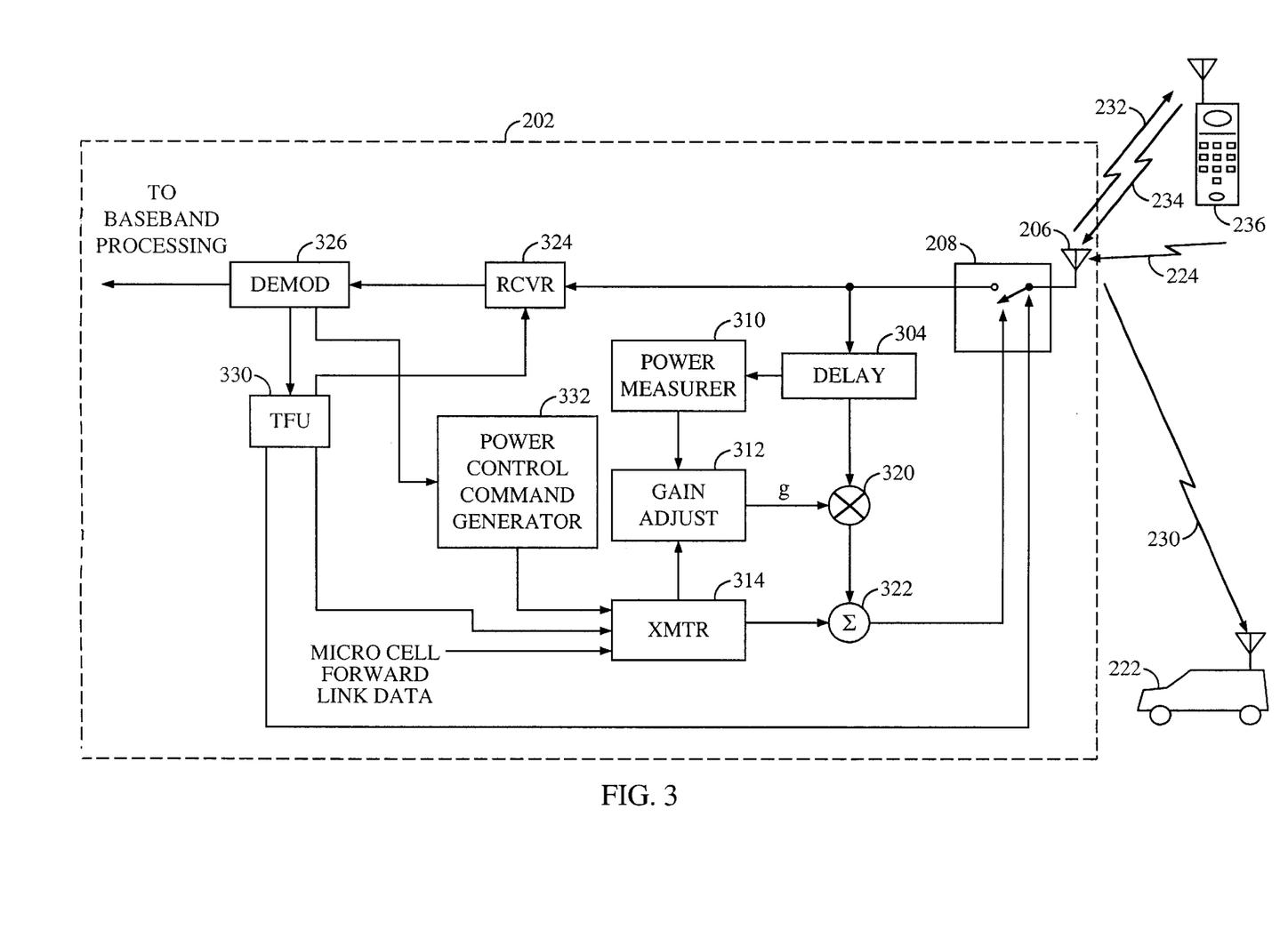
FIG. 3 is a block diagram of a first embodiment of the micro base station of the present invention.

In a first embodiment of the present invention, the micro base station 202 combines the macro base station forward link signal with its own outgoing forward link signal at radio frequency (RF). FIG. 3 illustrates this first embodiment of the present invention. The macro base station forward link signal is received by micro base station 202 over forward link path 224. Antenna 206 passes this received forward link signal through duplexer 208 to delay element 304. Delay element 304 introduces a predetermined time delay, which will be discussed in detail below, into the received forward link signal. The delayed forward link signal is passed to scaling element 320 which scales the delayed forward link signal according to the scaling factor, g, generated by gain adjust element 312. Scaling element 320 may contain attenuators, amplifiers, or both in order to adjust the level of the signal from macro base station 204 to the correct level. The construction of these elements are well know in the art.

Figure 4:
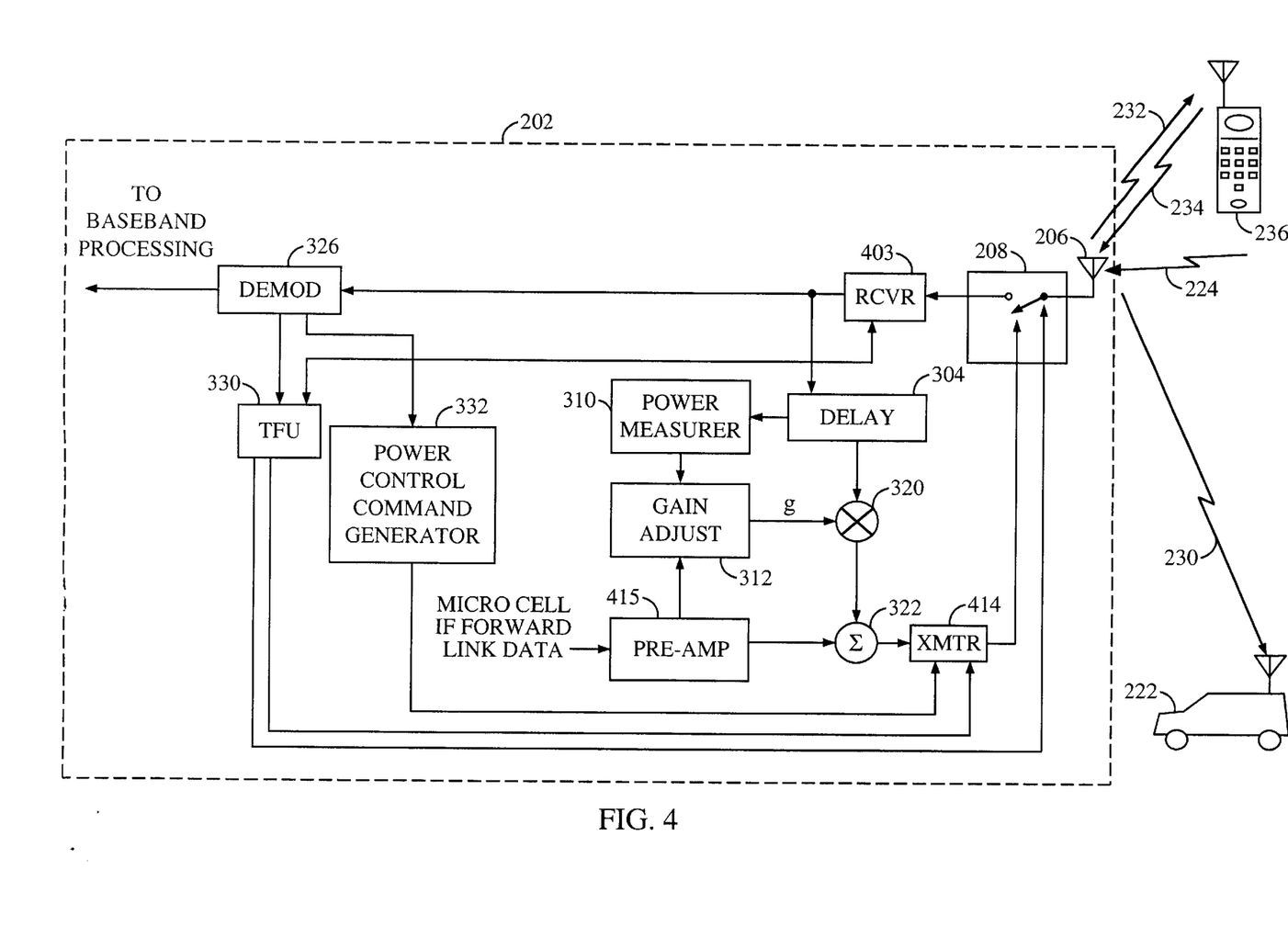
FIG. 4 is a block diagram of a second embodiment of the micro base station of the present invention.

In the preferred embodiment, duplexer 208 is a switch as is shown in FIGS. 3 and 4. As indicated above, it may be combined with a more conventional duplexer to allow for antenna 206 to be used for receiving the transmissions of portable station 236. In this use, duplexer 208 separates the received transmissions from portable station 236 and feeds them to receiver 324. This is not shown in the FIGS as this is well known in the art.

In the preferred embodiment, the scaling factor, g, is determined in accordance with the received power of the forward link signal as measured by power measurer 310, as well as the gain of the micro base station forward link signal as transmitted by transmitter (XMTR) 314. The scaling factor, g, provides a means of scaling the received macro base station forward link signal with respect to the micro base station forward link data signal, which has been upconverted and amplified by XMTR 314. This scaling is performed in order to ensure sufficient $E_b/N_0$ of the retransmitted macro base station forward link data at mobile station 222 without unduly degrading the $E_b/N_0$ of the micro base station's own forward link data at the micro base station user's portable station 236. The scaled macro base station forward link signal is combined in combiner 322 with the micro base station forward link signal generated by XMTR 314. The resultant combined forward link signal is provided through duplexer 208 to antenna 206 where it is radiated over forward link paths 230 and 232.

In a second embodiment of the present invention, the micro base station 202 combines the macro base station forward link signal with its own outgoing forward link signal at an intermediate frequency (IF). FIG. 4 illustrates this second embodiment of the present invention. In this second embodiment, the macro base station forward link signal is received by micro base station 202 over forward link path 224. Antenna 206 passes this received forward link signal through duplexer 208 to receiver 403 where the signal is downconverted to IF. The IF macro base station forward link signal is then passed to delay element 304 which introduces a predetermined time delay into the IF macro base station forward link signal. The delayed IF macro base station forward link signal is passed to scaling element 320 which scales the delayed forward link signal according to the scaling factor, g, generated by gain adjust element 312. In the preferred embodiment, the scaling factor, g, is determined in accordance with the received power of the forward link signal as measured by power measurer 310, as well as the gain of the IF micro base station forward link signal as amplified by pre-amplifier 415. The scaling factor, g, provides a means of scaling the IF macro base station forward link signal with respect to the IF micro base station forward link data signal which has amplified by pre-amplifier 415. The scaled IF macro base station forward link signal is combined in combiner 322 with the IF micro base station forward link signal. The resultant combined forward link signal is provided to transmitter 414 where it is upconverted, amplified, and transmitted through duplexer 208 over antenna 206 where it is radiated over forward link paths 230 and 232.

As a result, the transmit power of the forward link of macro base station 204 follows the curve 106 in FIG. 1. Specifically, the effective power density (or power received by the mobile station 222) of the forward link of macro base station 204 follows curve 106 which is very close to that radiated by the macro base station 204 only (curve 102) until the mobile station 222 gets close to the micro base station 202. At that point, mobile station 222 is able to receive both the micro base station 202 and the macro base station 204, the result of which is somewhat above curve 102. If the mobile station 222 is very close to the micro base station 202, then the power is essentially that of the micro base station 202 only and follows curve 104.

Since the forward link of the macro base station 204 is on the same frequency assignment as the forward link of the micro base station 202, it is critical to the present invention that the micro base station 202 is not "listening" to the macro base station 204 while the micro base station 202 itself is transmitting. Clearly, this would cause unacceptable self-interference. Thus, the present invention provides a timing scheme which avoids this self-interference.

Figure 5A:
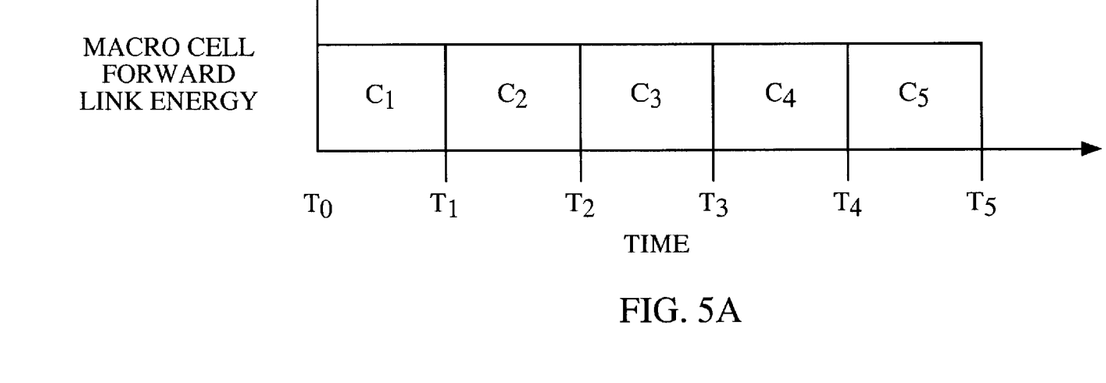
FIG. 5A graph of an exemplary portion of the macro base station forward link as transmitted over an arbitrary time interval.
Figure 5B:
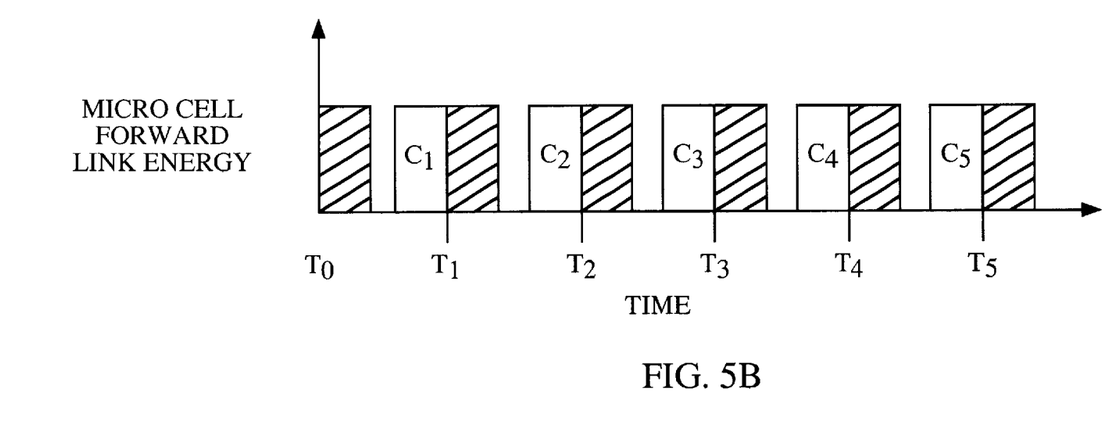
FIG. 5B is a graph of an exemplary portion of the micro base station combined forward link as transmitted over the same arbitrary time interval as FIG. 5A.

FIGS. 5A and 5B illustrate the timing scheme of the present invention. FIG. 5A is a graph of the macro base station forward link energy over a time period. In the exemplary illustration, the macro base station forward link has been illustrated over time interval $T_0$-$T_5$. The data in time interval $T_0$-$T_5$ is represented in FIG. 5A as $C_1$ through $C_5$, respectively. As can be seen from FIG. 5A, the macro base station may transmit data continuously over the time interval $T_0$-$T_5$, as would be typically done in a system complying to the IS-95 standard. Thus, FIG. 5A represents a generic example of the macro base station forward link signal over time that would be observed on forward link path 224 of FIGS. 2, 3 and 4.

FIG. 5B is a graph of the micro base station forward link energy over the same time intervals as FIG. 5A. The shaded portions of the time intervals indicate times when the micro base station 202 is not transmitting, but rather is "listening" to the macro base station forward link signal as represented by FIG. 5A. The non-shaded portions represent times when the micro base station 202 is transmitting the combined signal comprising the micro base station forward link data and the macro base station forward link data. As can be seen from FIG. 5B, the micro base station 202 does not transmit substantially continuously over the time interval $T_0$-$T_5$, but rather switches roughly on the "half-interval" of each time interval between transmitting a combined signal, and receiving the macro base station forward link signal. In the preferred embodiment, a brief guard period, during which the micro base station is neither transmitting a combined signal nor receiving the macro base station forward link signal, is also provided. This guard period is represented in FIG. 5B by the brief blank periods between successive shaded and non-shaded blocks. Thus, FIG. 5B represents a generic example of the micro base station combined forward link signal over time that would be observed on forward link paths 230 and 232 of FIGS. 2, 3 and 4.

In the preferred embodiment, the timing scheme of FIG. 5B is accomplished by delay element 304, and switching means of duplexer 208. Alternatively, receiver 324 (FIG. 3) or 403 (FIG. 4), and transmitter 314 (FIG. 3) or 414 (FIG. 4), respectively, may implement the switching means by alternatively masking the transmit and receive signals. In the preferred embodiment, during the time represented by the shaded periods of FIG. 5B, duplexer 208 routes the incoming macro base station forward link signal to delay element 304 and receiver 324 (FIG. 3) or 403 (FIG. 4). Thus, the micro base station "listens" to the first half of each macro base station forward link data interval $C_1$-$C_5$ of FIG. 5A. As previously mentioned, delay element 304 introduces a predetermined time delay into the received macro base station forward link signal. This predetermined time delay is equal to the switching period, i.e. one half-interval. During the time periods represented by the non-shaded portions of FIG. 5B, duplexer 208 routes the outgoing combined forward link signal to antenna 206 for radiation over forward link paths 230 and 232. Thus, the combined signal transmitted by the micro base station, as represented by the non-shaded portions of FIG. 5B, includes the macro base station forward link data from the immediately preceding half-interval.

Since the micro base station 202 cannot "listen" to the macro base station 204 forward link when the micro base station 202 itself is transmitting, the micro base station 202 will essentially "miss" half of the data transmitted on the macro base station 204 forward link. That is to say that it will not be able to delay and retransmit the second half of each macro base station 204 forward link data interval $C_1$-$C_5$. Thus, the period of the switching interval is preferably chosen such that the "missed" data has a minimal effect on the ability of mobile station 222 or portable station 236 to demodulate and decode the combined forward link signal. The determination of an acceptable switching period is very dependent on the design of the forward link used by macro base station 204 and micro base station 202 on their respective forward links.

Figure 6:
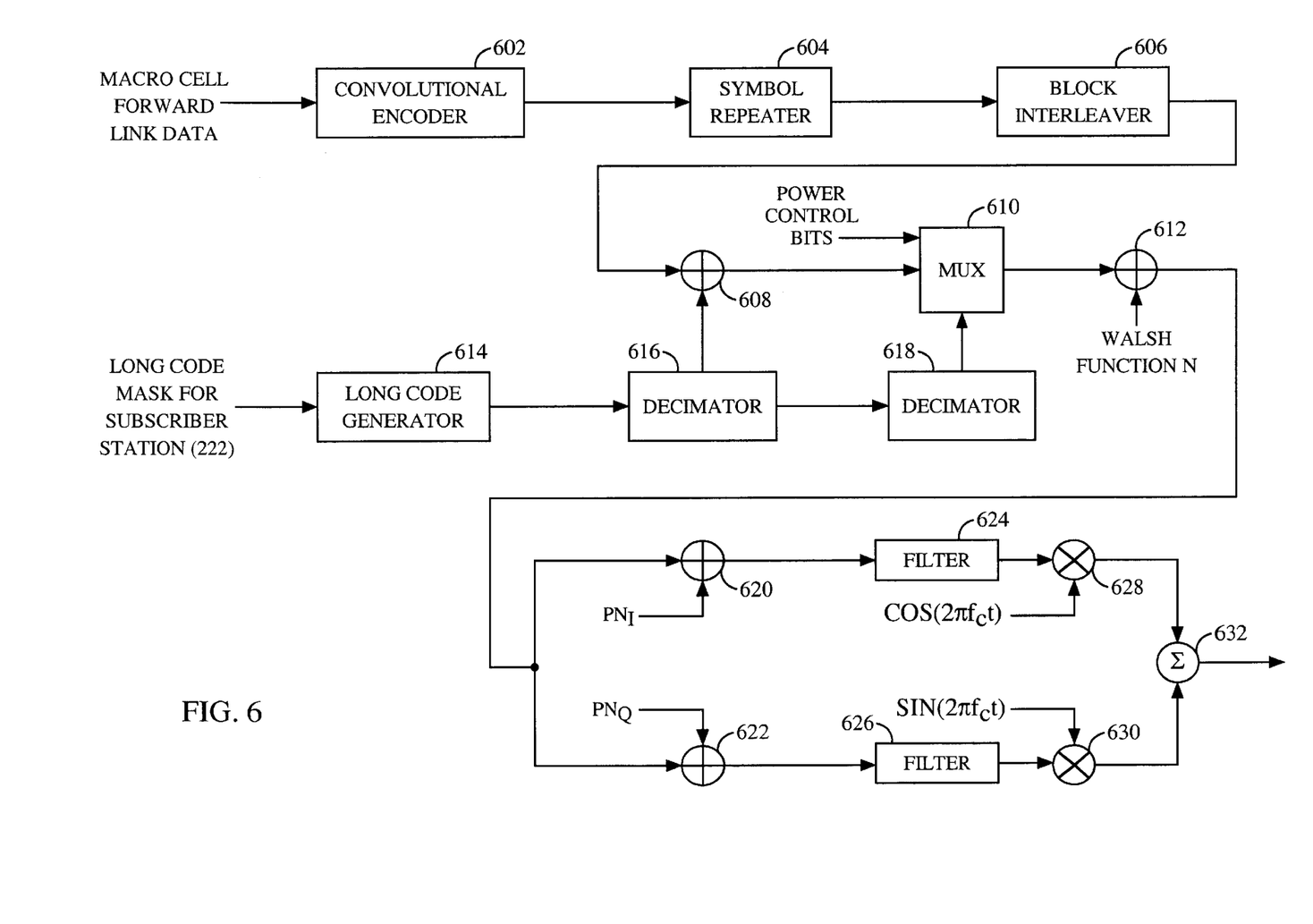
FIG. 6 is a block diagram of an exemplary encoding and modulating apparatus of the macro base station.

An exemplary forward link encoding and modulation scheme for a forward traffic channel of macro base station 204 or micro base station 202 is illustrated in FIG. 6 and is based upon IS-95. It should be noted that other communication channels, such as pilot and synchronization channels, may be encoded and modulated in a similar manner. However, for clarity and simplicity, the operation of a traffic channel will be discussed herein.

In FIG. 6, forward link information data which has been multiplexed into frames is presented to convolutional encoder 602. In the exemplary embodiment, the convolutional code is rate ½, thereby generating two code symbols for each data bit input to the convolutional encoder 602. Also, in the exemplary embodiment, the convolutional encoder 602 has a constraint length of nine. Convolutional encoding, as is known in the art, involves the modulo-two addition of selected taps of the serially time-delayed input data sequence. The length of the data sequence delay is equal to K-1, where K is the constraint length. Thus, the output of convolutional encoder 602 is twice the rate of the input, with each of the resulting convolutionally encoded modulation symbols being dependent on other adjacent modulation symbols according to the constraint length. Clearly, other code rates and constraint lengths could be used.

The output of convolutional encoder 602 is presented to symbol repeater 604. In the exemplary embodiment, symbol repeater 604 repeats each convolutionally encoded modulation symbol in accordance with the information data rate, resulting in an output having a constant modulation symbol rate. For example, if the information data rate is at a highest rate of 9600 bps, there is no symbol repetition. At an information data rate of one-half the highest rate, or 4800 bps, each code symbol is repeated one time (each symbol occurs two consecutive times). At an information data rate of one-quarter of the highest rate, or 2400 bps, each code symbol is repeated three times. And at an information data rate of one-eighth the highest rate, or 1200 bps, each code symbol is repeated seven times. As can be seen, this example would result in a constant modulation symbol rate of 19,200 modulation symbols per second being output from symbol repeater 604. Clearly, other rate sets may be employed.

The output symbols from symbol repeater 604 are presented to block interleaver 606, which in the exemplary embodiment for a traffic channel, spans 20 ms, which is equivalent to 384 modulation symbols at the exemplary modulation symbol rate of 19,200 symbols per second. The interleaver array is 24 rows by 16 columns. The symbols are written into the array of block interleaver 606 by columns, and read out in a pattern that greatly disperses adjacent modulation symbols.

In the exemplary case of a forward traffic channel, the interleaved modulation symbols read out from block interleaver 606 are input to modulo two adder 608, where they are masked by the long code PN sequence assigned to mobile station 222. Long code generator 614 generates a PN sequence at a rate of 1.2288 Mcps, which is thereafter downsampled to 19,200 ksps by decimator 616 to match the modulation symbol rate. The PN sequence is further downsampled by decimator 618 to mask or randomize the locations of the power control bits that are punctured into the forward traffic channel by multiplexer (MUX) 610.

Thereafter, the forward traffic data is orthogonally spread with respect to other forward channels by an assigned traffic channel Walsh Function having a fixed chip rate of 1.2288 Mcps in modulo-two adder 612. Then the forward traffic data is quadrature spread by I-channel and Q-channel PN spreading sequences $PN_I$ and $PN_Q$, respectively, in modulo-two adders 620 and 622. The I and Q channel data is filtered in filters 624 and 626, respectively, and then upconverted to the carrier frequency, $f_c$, by mixers 628 and 630. The resulting I and Q channel RF signals are then combined in combiner 632 and output for further power amplification and radiation over antenna 216 (see FIG. 2). The exemplary encoding and modulation scheme of FIG. 6 is described in more detail in the above-referenced U.S. Pat. No. 5,103,459.

The just-described exemplary encoding and modulation scheme is very robust and error resistant. As a result, the amount of "listening" time may be somewhat less than 50% duty cycle without significant loss of data. Thus, the switching period used by the present invention in a communication system employing such a powerful error coding scheme may be variable over a greater range than that used in a system that has a narrower bandwidth and thus must use less powerful schemes. For example, in the exemplary embodiment just described, every information bit has been encoded by a rate ½ convolutional encoder 602. Therefore, every bit has at least two modulation symbols, with the lower rates having even more redundancy added by symbol repeater 604. Furthermore, the adjacent modulation symbols are greatly dispersed in time by block interleaver 606. Additionally, the constraint length of the convolutional encoder 602 and the uniqueness of the code symbols used both add to the robustness of the encoding scheme. As a result, assuming sufficient energy of the transmitted signal, the switching period may be on the order of milliseconds without significant loss of data. Assuming a 20 ms frame, the switching period may approach 10 ms. Alternatively, the switching period may be less, on the order of the duration of a single modulation symbol, in which case, every other symbol would be lost. In still another embodiment, the switching period may be even less, on the order of the duration of a single PN chip. In yet another embodiment, the switching period may be randomized. The determination of an acceptable switching period is very dependent on the design of the forward link used by macro base station 204 and micro base station 202 on their respective forward links. In the example of a system conforming to the IS-95 standard, the period $T_{i+1}-T_i$ should be long enough so that the delay is greater than one PN spreading chip (so that the multipath created by micro base station 202 is separated by at least one chip) and so that the transmitted spectrum is that of the original IS-95 signal. However, the period $T_{i+1}-T_i$ should not be so long so that the mobile station 222 is not able to track the phase and timing of the base stations. A further consideration occurs with IS-95 systems with orthogonal forward links separated by Walsh functions. When the mobile station receives only a part of a Walsh function, then the orthogonality is somewhat lost and the required signal to noise ratio increases due to the coupling between the forward link Walsh channels. To maintain orthogonality, switching could be done every Walsh function or exact multiple of a time span of a Walsh function. To be even more specific in the context of an IS-95 system, the power control bit locations are randomized and are multiplexed into the data stream as shown in FIG. 6. These power control bits occupy one or two Walsh functions in every 1.25 ms on the forward link. For the IS-95 system, one could randomize the time of switching so that the mobile station 222 receiving the macro base station 204 receives all of the power control bits. The exact switching duration and the exact switching time that is chosen depends upon these items, plus others such as the complexity of delay 304.

It should be noted that the mobile station 222 (see FIG. 2) which is communicating with the macro base station 204 continues to transmit reverse link data to macro base station 204 over reverse link path 228. Even though mobile station 222 is receiving the combined forward link signal from micro base station 202 over micro base station forward link path 230, micro base station 202 does not demodulate the signal from mobile station 222 even though the signal from mobile station 222 could be strong enough to demodulate. In other words, mobile station 222 does not execute a handoff to micro base station 202 even though the pilot signal strength of micro base station 202 may exceed the nominal threshold for handoff, as discussed in the above-referenced U.S. Pat. No. 5,101,501.

The combined forward link signal received from micro base station 202 over forward link path 230 appears to mobile station 222 to be very similar to any other multipath component originating at macro base station 204, except that the signal will be "chopped" on the half interval. Thus, the mobile station 222, which in the preferred embodiment is capable of diversity combining of multipath signals, will be aided sufficiently by the additional energy provided by forward link path 230 to avoid unacceptably high demodulation error rates. Furthermore, since the micro base station 202 retransmits whatever it receives on the particular frequency assignment, i.e. the entire macro base station forward link, addition of more "foreign" mobile units 222 does not increase the load on the micro base station 202.

In many cases, the micro base station 202 will be within the coverage area of one macro base station 204. In this case, it is retransmitting only the forward link of that one macro base station 204. However, as is disclosed in U.S. Pat. No. 5,101,501, issued Mar. 31, 1992, entitled "METHOD AND SYSTEM FOR PROVIDING A SOFT HANDOFF IN COMMUNICATIONS IN A CDMA CELLULAR SYSTEM", all CDMA base stations transmit on the same frequency and soft handoff can be used by mobile stations. In this case, the micro base station 202 will re-transmit the signals of those base stations which it is receiving, with a power proportional to the strength which they are being received by the micro base station 202.

II. Time and Frequency Reference

In accordance with another aspect of the present invention the micro base station 202 demodulates at least one logical channel of the macro base station 204 forward link signal in order to obtain a stable time and frequency reference. As previously explained, the macro base station 204 typically includes means for maintaining extremely accurate time and frequency reference. This is generally accomplished by means of a Global Positioning System (GPS) satellite receiver (not shown) or other expensive equipment. However, it may be prohibitively expensive to provide such precision equipment at the micro base station 202. Thus, in the present invention, the micro base station 202 obtains the accurate time and frequency reference from macro base station 204.

Referring back to FIG. 3, antenna 206 captures the macro base station forward link signal from forward link path 224, and routes it to receiver (RCVR) 324 via duplexer 208. Receiver 324 downconverts the RF signal, and passes it to demodulator (DEMOD) 326. Demodulator 326 searches for, acquires, and demodulates the pilot channel which is transmitted as part of the macro base station forward link signal. In the exemplary CDMA system, this pilot signal may be used to obtain initial system synchronization and to provide robust time frequency and phase tracking of the macro base station forward link signal. Also, in the exemplary CDMA system, each base station transmits a synchronization channel which uses the same PN sequence and PN phase as the pilot channel and can be demodulated whenever the pilot channel is being tracked. This sync channel carries a message containing macro base station 204 identification and the exact macro base station 204 pilot PN carrier phase offset.

This synchronization information is passed from demodulator 326 to time and frequency unit (TFU) 330. TFU 330 is then able to determine exact System Time and obtain a stable frequency reference from the macro base station 204. TFU 330 then provides this timing and frequency information to transmitter 314 and receiver 324, and provides timing information to duplexer 208 if duplexer 208 is performing the switching function. In the context of the IS-95 system, the micro base station 202 may not need to demodulate the sync channel of the macro base station 204 to obtain macro base station identification and pilot PN carrier phase offset. This is because micro base station 202 doesn't move and this information is static. Thus, this information can be supplied to micro base station 202 by other means such as by the installer of the micro base station 202.

The same teachings are applicable to the embodiment of FIG. 4 with respect to receiver 403 and transmitter 414. Micro base station 202 may then track the macro base station pilot channel continuously, or it may "freewheel" for a predetermined time period, and obtain System Time and frequency reference updates only periodically.

It should be noted that although the time and frequency referencing aspect of the present invention has been described herein with reference to an exemplary CDMA system, the teachings of the present invention are equally applicable to other communication systems, whether digital or analog, and regardless of the modulation or channelization scheme employed. For example, the present invention may also be used in a communication system where the macro base station pilot channel itself carries a System Time reference. Additionally, the pilot channel may not be on the same carrier frequency or time slot as any of the other forward link channels. The present invention is not intended to be limited to the specific examples shown herein, and one of ordinary skill in the art may apply its teachings to a wide variety of communication systems.

III. Micro Base Station Power Control

In accordance with another aspect of the present invention, the micro base station 202 controls the reverse link power level of portable station 236 to avoid excessive interference with the reverse link signals of other subscriber stations, such as mobile station 222, that are received at macro base station 204. As is known in the art, wireless communication system 200 may use a combination of open loop and closed loop power control methods to maximize capacity and prevent excessive interference among subscriber stations. In open loop power control methods, the pilot signal transmitted power is measured as received at the subscriber station. The subscriber station then adjusts its transmit power inversely in response; the weaker the received signal, the stronger the subscriber station's transmitter power. In closed loop power control methods, the cell-site transmits power adjustment commands to the subscriber station to nominally increase or decrease the subscriber station transmitter power by a predetermined amount. Such a power control system and method is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM," assigned to the assignee of the present invention and incorporated herein by reference.

In the just-mentioned patent, the combination of open and closed loop power control is used to adjust the transmit power of all mobile stations 222 that are in communication with macro base station 204 so as to arrive at the macro base station 204 at substantially the same predetermined power level. The same power control techniques may be used to control the transmit power of all portable stations 236 that are communicating with micro base station 202 so as to arrive at micro base station 202 at substantially the same predetermined power level. However, since portable station 236 will typically not be in communication with macro base station 204 as long as it has satisfactory communications with micro base station 202 (to avoid cellular system access charges), macro base station 204 is not able to use closed loop power control commands to instruct portable station 236 to "turn down" its transmitter power. As is shown in FIG. 2, the received power from the micro base station 202 gets weaker as the portable station 236 moves further away from micro base station 202. As a result of both open and closed loop power control, portable station 236 communicating with micro cell 202 will transmit enough power to be received by micro cell 202. As a consequence, as portable station 236 moves farther away from micro base station 202, it would continue to increase its power to a level which could cause unacceptable interference on reverse link path 228.

In the present invention, this unacceptable interference is avoided by the micro base station 202 either terminating communication with portable station 236 or executing a handoff of portable station 236 to macro base station 204 when the transmit power of portable station 236 exceeds a predetermined threshold. In a first embodiment, the micro base station 202 itself determines when the transmit power of portable station 236 may be too high.

In this first embodiment, applicable to either FIG. 3 or 4, the reverse link signal from portable station 236 is received by antenna 206 and passed to receiver 324 (FIG. 3) or receiver 403 (FIG. 4). Receiver 324 or 403 downconverts the received reverse link signal as previously discussed, and passes it to demodulator 326. Power control command generator 332 measures the average power of the demodulated reverse link signal from portable station 236, compares that average power with a desired threshold, and generates either a "turn up" or "turn down" command for transmission to portable station 236 through transmitter 314 (FIG. 3) or 414 (FIG. 4) in the manner discussed in the above-referenced U.S. Pat. No. 5,056,109.

Intuitively, as portable station 236 travels away from micro base station 202, the average reverse link signal power as measured by power control command generator 332 will tend to decrease due to path loss. In response, power control command generator 332 will transmit a series of "turn up" commands to portable station 236. In this first embodiment, power control command generator 332 keeps track of how frequently it is required to transmit a "turn up" command to portable station 236. If it transmits more than a predetermined number of "turn up" commands in a sequence of power control commands, corresponding to the condition where portable station 236 is having to transmit at a relatively high power level in order to provide a sufficient reverse link signal over reverse link path 234, micro base station 202 will either terminate communication with portable station 236, or execute a handoff of portable station 236 to macro base station 204. For example, if the micro base station transmitted K power up commands in a group of N power control commands, then the micro base station may determine that the personal station has exceeded the desired range.

In a second embodiment, the transmit power of portable station 236 is limited to a predetermined maximum level when communicating with micro base station 202. This can be accomplished by some prefixed rules in the programming of portable station 236 so that when the portable station is using the micro base station 202, its transmit power is limited to the predetermined maximum level. It should be noted that the portable station 236 would not perform such limiting when communicating with the macro base station 204. This power limitation can be readily accomplished by one skilled in the art, for example, by modifying the teachings of the above-referenced U.S. Pat. No. 5,056,109 to provide for the portable station 236 to ignore "turn up" commands once its transmit power has exceeded the predetermined maximum level while it is communicating with micro base station 202. A circuit designed to ignore "turn up" commands after the portable station 236 transmit power exceeds a predetermined threshold is disclosed in U.S. Pat. No. 5,452,473, entitled "REVERSE LINK, TRANSMIT POWER CORRECTION AND LIMITATION IN A RADIOTELEPHONE SYSTEM," issued Sep. 19, 1995, assigned to the assignee of the present invention and incorporated herein by reference. In this embodiment, the micro base station 202 will be able to sense that the portable station 236 is at the edge of the cell coverage by noting that the portable station 236 has not complied with a series of "turn up" commands. The micro base station 202 may then release the call. However, a conventional maximum power level would be used by the portable station 236 when communicating with macro base station 204.

Power limitation of portable station 236 can also be accomplished by a command from micro base station 202 which indicates to the portable station 236 to limit its transmit power to a maximum level. Micro base station 202 may determine this maximum level by monitoring (with power measurer 310 of FIGS. 3 and 4) the amount of power received from macro base station 204. The higher the received power from macro base station 204, the higher the allowed maximum transmit power of portable station 236 may be without causing undue interference to other mobile stations operating within the macro base station's 204 cell.

Alternatively, portable station 236 can signal micro base station 202 with a signaling message indicating that it has reached its power limit or a power threshold. Along with this signaling message, portable station 236 may indicate the pilot strengths of surrounding base stations, as is done with the existing IS-95 Pilot Strength Measurement Message and described in further detail in the above-referenced U.S. Pat. No. 5,101,501. This permits micro base station 202 to determine whether to hand portable station 236 off to macro base station 204.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for operating a first wireless base station on a same frequency band as a second wireless base station, said first wireless base station generating and transmitting a first forward link data signal and communicating with a first subscriber station, said second wireless base station generating a second forward link data signal and communicating with a second subscriber station, the method comprising the steps of:

a) receiving, at said second wireless base station, said first forward link data signal;

b) combining, at said second wireless base station, said received first forward link data signal with said second forward link data signal to form a combined forward link data signal; and c) transmitting, from said second wireless base station, said combined forward link data signal.

2. The method of claim 1 further comprising the step of delaying said received first forward link data signal for a delay period.

3. The method of claim 2 further comprising the step of switching between said step of receiving said first forward link data signal and transmitting said combined forward link data signal at a switching period.

4. The method of claim 3 wherein said switching step of switching is performed at a 50% duty cycle.

5. The method of claim 3 wherein said delay period is greater than one PN spreading chip in duration.

6. The method of claim 3 wherein said step of switching occurs only at Walsh function boundaries.

7. The method of claim 3 wherein said switching period is of random duration.

8. The method of claim 3 further comprising the steps of:

a) measuring a power level of said delayed received first forward link data signal; and b) adjusting said power level of said delayed received first forward link data signal in response to said measuring step.

9. The method of claim 3 further comprising the steps of:

a) transmitting power control commands to said second subscriber station, each of said power control commands indicating an increase or decrease in transmit power; and b) terminating communication with said second subscriber station if said second base station transmits a predetermined number of consecutive power control commands indicating an increase in transmit power.

10. The method of claim 3 further comprising the steps of:

a) transmitting power control commands to said second subscriber station, each of said power control commands indicating an increase or decrease in transmit power; and b) executing a handoff of said second subscriber station to said first base station if said second base station transmits a predetermined number of consecutive power control commands indicating an increase in transmit power.

11. The method of claim 3 further comprising the step of said second subscriber station limiting transmit power to a predetermined maximum level when communicating with said second base station, said predetermined maximum level being less than a conventional maximum level used when communicating with said first base station.

12. The method of claim 11 further comprising the step of said second base station commanding said second subscriber station to limit transmit power to said predetermined maximum level.

13. The method of claim 11 further comprising the step of said second subscriber station transmitting a signaling message, indicating that said second subscriber station is transmitting at said predetermined maximum level, to said second base station.

14. The method of claim 3 further comprising the steps of:
   a) demodulating, in said second base station, said received first forward link data signal; and
   b) determining a time reference from said demodulated received first forward link data signal.

15. The method of claim 3 further comprising the steps of:
   a) demodulating, in said second base station, said received first forward link data signal; and
   b) determining a frequency reference from said demodulated received first forward link data signal.

16. A system for providing personal base station operations within the coverage area of a wireless communication system, the system comprising:
   a) a first wireless base station for generating and transmitting a first forward link data signal on a predetermined frequency band; and
   b) a second wireless base station for generating a second forward link data signal, said second wireless base station comprising:
      1) a receiver for receiving said first forward link data signal;
      2) a combiner for combining said received first forward link data signal with said second forward link data signal to form a combined forward link data signal; and
      3) a transmitter for transmitting said combined forward link data signal on said predetermined frequency band.

17. The system of claim 16 further comprising a delay element for delaying said received first forward link data signal for a delay period.

18. The system of claim 17 further comprising switching means for switching between said receiver and said transmitter at a switching period.

19. The system of claim 18 wherein said switching means switches between said receiver and said transmitter at a 50 percent duty cycle.

20. The system of claim 18 wherein said delay period is greater than one PN spreading chip in duration.

21. The system of claim 18 wherein said switching means switches between said receiver and said transmitter only at Walsh function boundaries.

22. The system of claim 18 wherein said switching period is of random duration.

23. The system of claim 18 further comprising:
   a) a power measurer for measuring a power level of said delayed received first forward link data signal; and
   b) a gain adjuster for adjusting said power level of said delayed received first forward link data signal in response to said power level measurement.

24. The system of claim 18 further comprising a power control command generator for generating power control commands, each of said power control commands indicating an increase or decrease transmit power, and wherein said second base station terminates communication with said second subscriber station if said second base station transmits K power control commands indicating an increase in transmit power within a group of N power control commands, where K is a predetermined number less than N.

25. The system of claim 18 further comprising a power control command generator for generating power control commands, each of said power control commands indicating an increase or decrease transmit power, and wherein said second base station executes a handoff of said second subscriber station to said first base station if said second base station transmits a predetermined number of consecutive power control commands indicating an increase in transmit power.

26. The system of claim 18 wherein said second subscriber station limits transmit power to a predetermined maximum level when communicating with said second base station, said predetermined maximum level being less than a conventional maximum level used when communicating with said first base station.

27. The system of claim 26 wherein said second base station commands said second subscriber station to limit transmit power to said predetermined maximum level.

28. The method of claim 26 wherein said second subscriber station transmits a signaling message, indicating that said second subscriber station is transmitting at said predetermined maximum level, to said second base station.

29. The system of claim 18 further comprising:
   a) a demodulator for demodulating said received first forward link data signal; and
   b) time reference determining means for determining a time reference from said demodulated received first forward link data signal.

30. The system of claim 18 further comprising:
   a) a demodulator for demodulating said received first forward link data signal; and
   b) frequency reference determining means for determining a frequency reference from said demodulated received first forward link data signal.

31. The system of claim 18 wherein said second base station commands said second subscriber station to have a threshold which is used to detect when the subscriber station's output power exceeds this threshold.

32. The method of claim 31 wherein said second subscriber station transmits a signaling message, indicating that said second subscriber station is transmitting at said predetermined level, to said second base station.

* * * * *